US012597743B2

(12) United States Patent
Trawick

(10) Patent No.: US 12,597,743 B2
(45) Date of Patent: Apr. 7, 2026

(54) VARIABLE LENGTH WIRE HARNESS FOR ELECTRONIC DEVICES

(71) Applicant: Rolls-Royce Corporation, Indianapolis, IN (US)

(72) Inventor: David R. Trawick, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 343 days.

(21) Appl. No.: 18/144,423

(22) Filed: May 8, 2023

(65) Prior Publication Data

US 2024/0380168 A1 Nov. 14, 2024

(51) Int. Cl.
*H01R 24/28* (2011.01)
*H01R 13/405* (2006.01)
*H01R 107/00* (2006.01)

(52) U.S. Cl.
CPC .......... *H01R 24/28* (2013.01); *H01R 13/405* (2013.01); *H01R 2107/00* (2013.01)

(58) Field of Classification Search
CPC ................ H01R 14/28; H01R 40/90
USPC ................ 439/752, 847, 877, 695
See application file for complete search history.

(56) References Cited

U.S. PATENT DOCUMENTS 3,569,915 A 3/1971 Sorensen et al.
3,667,101 A * 6/1972 Kloth .................. H01R 13/432 29/749
3,670,292 A 6/1972 Tracy
3,701,965 A 10/1972 DuRocher et al.
3,825,874 A 7/1974 Peverill
4,349,241 A 9/1982 Juris et al.
4,407,552 A 10/1983 Watanabe et al.
4,429,938 A 2/1984 Flor
4,440,463 A 4/1984 Gliha et al.
4,895,534 A * 1/1990 Klunk ................ H01R 13/4364 439/599
4,979,904 A 12/1990 Francis
5,658,170 A * 8/1997 Tan .................. H01R 13/65914 439/607.41
6,059,591 A * 5/2000 Bolen .................. H01R 35/025 439/15
6,419,519 B1 7/2002 Young
6,613,979 B1 9/2003 Miller et al.
7,726,994 B1 6/2010 Willey
7,744,285 B2 6/2010 Sepe, Jr.
7,931,486 B1 4/2011 Walters
8,246,372 B1 8/2012 Walters
9,257,796 B1 2/2016 Dang
10,320,118 B2 6/2019 Paul
10,996,406 B2 5/2021 Smith et al.
11,196,206 B2 12/2021 Ibarra et al.
11,431,121 B2 8/2022 Van Nierop et al.
(Continued)

FOREIGN PATENT DOCUMENTS

CN 104241933 12/2014

*Primary Examiner* — Phuong K Dinh
(74) *Attorney, Agent, or Firm* — Barnes & Thornburg

(57) ABSTRACT

A method of assembling a wire harness adapted for use with a piece of electrical equipment includes several steps. The wire harness includes a plurality of wires, a plurality of connector pins, and an electrical connector. The electrical connector is configured to be coupled to the piece of electrical equipment.

12 Claims, 7 Drawing Sheets

(56) References Cited

U.S. PATENT DOCUMENTS

| | | | |
|---|---|---|---|
| 2020/0099159 | A1 | 3/2020 | Muja et al. |
| 2022/0094098 | A1 | 3/2022 | Ibarra et al. |

* cited by examiner

VARIABLE LENGTH WIRE HARNESS FOR ELECTRONIC DEVICES

FIELD OF THE DISCLOSURE

The present disclosure relates generally to electric devices, and more specifically to wire harnesses for use with electric devices.

BACKGROUND

During early phases of product development for a piece of electronics, such as an inverter, it is often difficult to fully model all of the details of the unit to the level which will be observed in the first prototype. In particular, the routing of cable harnesses with their associated bend radii may be uncertain. For instance, a complete model would have to account for every other cable or component occupying space in the box, the real-world bend radius of a bundle of separately sourced wires, and complicating factors of cable construction such as splices, variable rigidity of heat shrink tubing or other bundling methods, and even capillary movement of solder within wires during connections or of sealants/epoxies around the outside of wires/inside of bundles.

In some embodiments, uncertainties of length and of bending capability may be addressed by padding the length of the wires to ensure that the first prototype's wires are not too short to connect. However, inside of the enclosure of an inverter or other tightly packed piece of electronics, a harness that is too long may not be able to reach due to the bend radii of the cable.

SUMMARY

The present disclosure may comprise one or more of the following features and combinations thereof.

A method of assembling a wire harness adapted for use with a piece of electrical equipment may include providing at least one wire, at least one connector pin, and an electrical connector. The electrical connector may include a connector housing that extends circumferentially about an axis to define an interior cavity.

In some embodiments, the method may further include inserting the at least one wire through a wire aperture formed in the connector housing of the electrical connector. The at least one wire is inserted through the wire aperture formed in the connector housing so that the at least one wire may extend into the interior cavity.

In some embodiments, the method may further include moving the at least one wire through the connector housing. The at least one wire is moved through the connector housing so that the at least one wire may have a desired length.

In some embodiments, the method may further include cutting the at least one wire to provide the desired length of wire. In some embodiments, the method may further include coupling the at least one connector pin to a terminal end of the at least one wire while the at least one wire extends through the connector housing. In some embodiments, the method may further include coupling the at least one connector pin with the connector housing.

In some embodiments, the at least one wire may have a wire core and an insulation layer. The insulation layer may extend around the wire core. A diameter of the wire aperture may be equal to or greater than an outer diameter of the insulation layer of the at least one wire.

In some embodiments, the electrical connector may further include a connector cap. The connector cap may be configured to be selectively coupled to the connector housing to close off a portion of the interior cavity.

In some embodiments, coupling the at least one connector pin relative to the connector housing may include inserting an end of the at least one connector pin into a connector pin aperture formed in the connector cap and coupling the connector cap to the connector housing so that the portion of the at least one connector pin is located in a fixed position axially between the connector housing and the connector cap. In some embodiments, the connector pin aperture formed in the connector cap may have a diameter that is less than the diameter of the wire aperture formed in the connector housing. In some embodiments, the connector pin may have a diameter that is greater than the wire apertures formed in the connector housing.

In some embodiments, the connector pin may include a pin body and a pin rod. The pin rod may extend axially from the pin body into the connector pin aperture so that a terminal end of the pin rod extends axially past the connector cap.

In some embodiments, the connector housing may include a back plate, an outer wall, and a cap retainer. The back plate may be formed to include the wire aperture. The outer wall may extend axially away from the back plate and extend circumferentially about the axis to define the interior cavity. The cap retainer may be coupled to the outer wall. The cap retainer may be configured to engage the connector cap to selectively couple the connector cap to the connector housing.

In some embodiments, the cap retainer may include a retainer tab and a lock tab. The retainer tab may extend radially inward from the outer wall into the interior cavity. The retainer tab may extend circumferentially at least partway about the axis. The lock tab may extend radially inward from the outer wall into the interior cavity. The lock tab may extend circumferentially at least partway about the axis.

In some embodiments, the lock tab may be spaced apart axially from the retainer tab to define a notch therebetween. The lock tab may be formed to include a ramp surface. The ramp surface may be shaped so that when the connector cap is moved toward the connector housing into contact with the ramp surface the connector cap bends around the lock tab to allow the connector cap to pass the lock tab and to move into the notch between the lock tab and the retainer tab to retain the connector cap in the notch.

In some embodiments, coupling the at least one connector pin with the connector housing includes applying an epoxy material to the connector housing. The epoxy material may be applied opposite the at least one connector pin.

In some embodiments, the connector housing may include a back plate formed to include the wire aperture and an outer wall that extends axially away from the back plate. The outer wall may extend circumferentially about the axis to define the interior cavity.

In some embodiments, the back plate may have a first axially-facing surface and a second axially-facing surface. The first axially-facing surface may define a portion of the interior cavity. The second axially-facing surface may face opposite the first axially-facing surface.

In some embodiments, coupling the at least one connector pin with the connector housing includes inserting the at least one connector pin into a corresponding snap feature in the first axially-facing surface of the back plate. The snap feature may be configured to retain the at least one connector pin in a fixed position relative to the connector housing.

According to another aspect of the present disclosure, a wire harness adapted for use with a piece of electrical equipment may include a plurality of wires, a plurality of connector pins, and an electrical connector. The plurality of wires may each have a wire core and an insulation layer extending around the wire core. The plurality of connector pins may each be coupled to a terminal end of one wire included in the plurality of wires. The electrical connector may be configured to be coupled to the piece of electrical equipment.

In some embodiments, the electrical connector may include a connector housing. The connector housing may extend circumferentially about an axis to define an interior cavity. The connector housing may be formed to include a plurality of wire apertures that extend axially through the connector housing.

In some embodiments, a diameter of each wire aperture included in the plurality of wire apertures is sized to receive the wire core and the insulation layer of the respective wire of the plurality of wires that extends therethrough. Each wire aperture may be sized to receive the wire core and the insulation of the respective wire so that each connector pin of the plurality of connector pins is at least partially located in the interior cavity of the connector housing in a fixed position relative to the connector housing.

In some embodiments, the diameter of each wire aperture may be equal to or greater than an outer diameter of the insulation layer of each wire of the plurality of wires. The diameter of each wire aperture may be equal to the outer diameter of the insulation layer of each wire of the plurality of wires. In some embodiments, the diameter of each wire aperture may be greater than the outer diameter of the insulation layer of each wire of the plurality of wires.

In some embodiments, the electrical connector may further include a connector cap. The connector cap may be configured to be selectively coupled to the connector housing to locate the plurality of connector pins axially in a fixed position axially between the connector housing and the connector cap.

In some embodiments, the connector cap may be formed to define a plurality of connector pin apertures that extend axially through the connector cap. Each connector pin included in the plurality of connector pins may extend into one of the plurality of pin apertures in the connector cap.

In some embodiments, the diameter of each wire aperture included in the plurality of wire apertures may be greater than a diameter of each connector pin aperture included in the plurality of connector pin apertures. In some embodiments, the diameter of each connector pin aperture included in the plurality of connector pin apertures may be less than the diameter of each wire aperture included in the plurality of wire apertures. In some embodiments, the connector pin may have a diameter that is greater than the wire apertures formed in the connector housing.

In some embodiments, the connector housing may include a back plate, an outer wall, and a cap retainer. The back plate may be formed to include the plurality of wire apertures. The outer wall may extend axially away from the back plate and may extend circumferentially about the axis to define the interior cavity. The cap retainer may be coupled to the outer wall and may be configured to engage the connector cap to selectively couple the connector cap to the connector housing.

In some embodiments, the cap retainer may include a retainer tab and a lock tab. The retainer tab may extend radially inward from the outer wall into the interior cavity and may extend circumferentially at least partway about the axis. The lock tab may extend radially inward from the outer wall into the interior cavity and may extend circumferentially at least partway about the axis, the lock tab spaced apart axially from the retainer tab to define a notch therebetween.

In some embodiments, the lock tab may be formed to include a ramp surface. The ramp surface may be shaped so that when the connector cap is moved toward the connector housing into contact with the ramp surface the connector cap bends around the lock tab to allow the connector cap to pass the lock tab and to move into the notch between the lock tab and the retainer tab to retain the connector cap in the notch.

In some embodiments, the back plate may have a first axially-facing surface that defines a portion of the interior cavity and a second axially-facing surface that faces opposite the first axially-facing surface. The wire harness may further include an epoxy material applied to the second axially-facing surface of the connector housing and the plurality of wires to help retain the plurality of connector pins in the fixed position.

In some embodiments, the connector housing may include a back plate formed to include the plurality of wire apertures and an outer wall that extends axially away from the back plate. The outer wall may extend circumferentially about the axis to define the interior cavity.

In some embodiments, the back plate may have a first axially-facing surface that defines a portion of the interior cavity and a second axially-facing surface that faces opposite the first axially-facing surface. The first axially-facing surface may be formed to define a plurality of snap features. Each of the snap features may be configured to mate with one connector pin of the plurality of connector pins to retain the plurality of connector pins in the fixed position.

In some embodiments, the connector housing may include a back plate formed to include the plurality of wire apertures and an outer wall that extends axially away from the back plate. The outer wall may extend circumferentially about the axis to define the interior cavity.

In some embodiments, the back plate may have a first axially-facing surface that defines a portion of the interior cavity and a second axially-facing surface that faces opposite the first axially-facing surface. The wire harness may further include an epoxy material applied to the second axially-facing surface of the connector housing and the plurality of wires to retain the plurality of connector pins in the fixed position.

These and other features of the present disclosure will become more apparent from the following description of the illustrative embodiments.

DETAILED DESCRIPTION OF THE DRAWINGS

Figure 1:
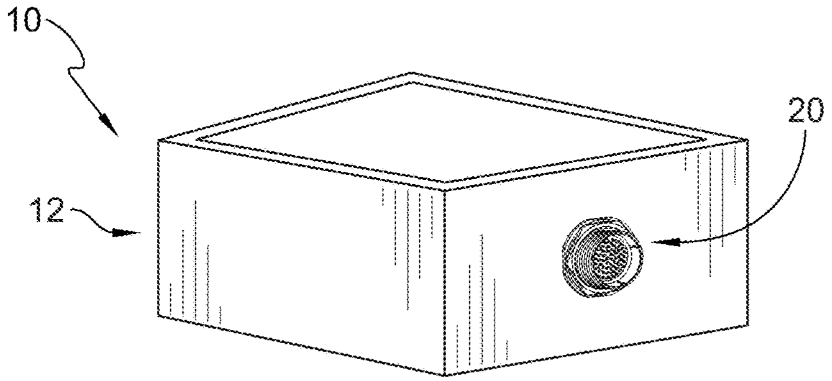
FIG. 1 is perspective view of a piece of electrical equipment including a wire harness according to the present disclosure and configured to route wires through the electrical equipment, the wire harness configured to allow a length of the wires to be adjusted to account for internal and external design changes of the electrical equipment.

For the purposes of promoting an understanding of the principles of the disclosure, reference will now be made to a number of illustrative embodiments illustrated in the drawings and specific language will be used to describe the same.

Figure 2:
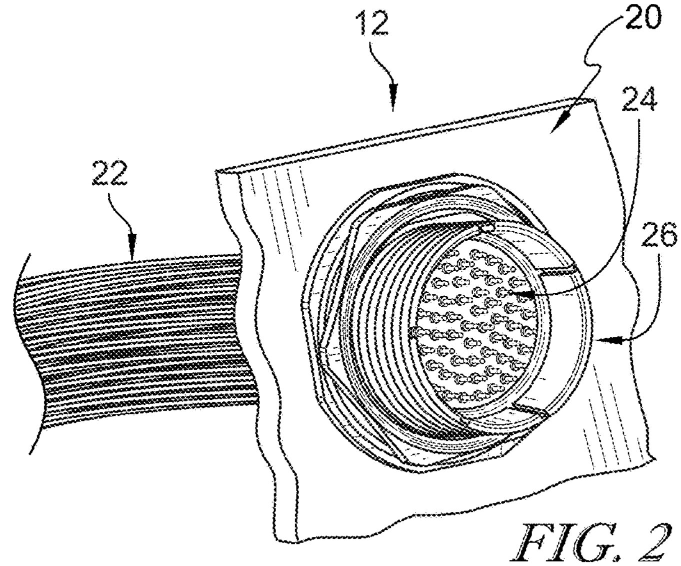
FIG. 2 is a perspective view of the wire harness adapted for use with the piece of electrical equipment of FIG. 1 showing the wire harness includes a plurality of wires, a plurality of connector pins each coupled to one wire in the plurality of wires, and an electrical connector having a connector housing that receives the plurality of wires and a connector cap configured to be selectively coupled to the connector housing that receives the plurality of connector pins.
Figure 3:
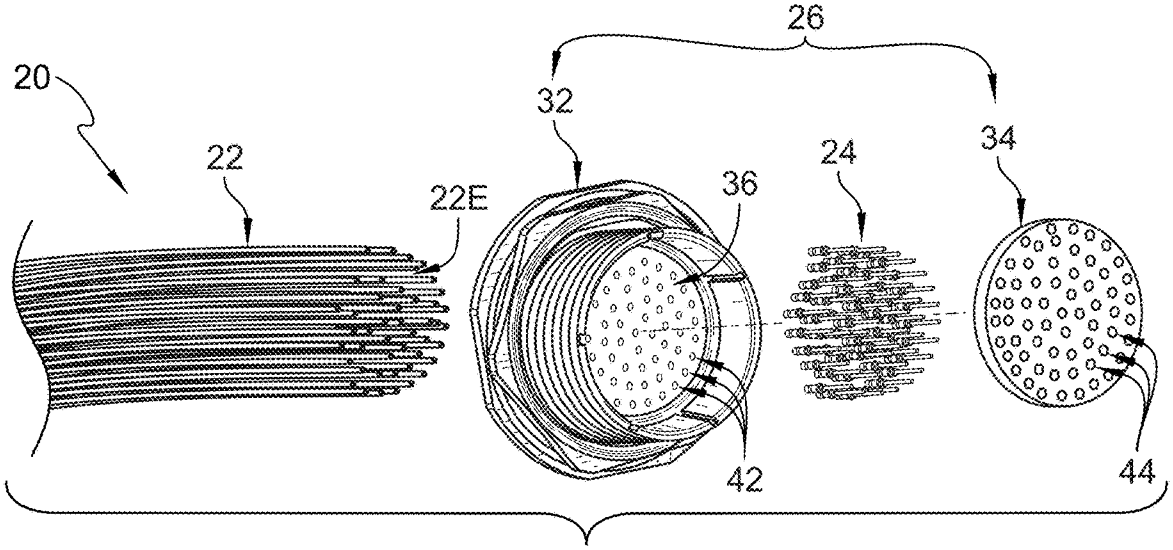
FIG. 3 is an exploded perspective view of the wire harness of FIG. 2 showing the wire harness includes the plurality of wires each having a wire core and an insulation layer, the plurality of connector pins, and the electrical connector having the connector housing shaped to define a plurality of wire apertures that extend axially therethrough, and the connector cap formed to define a plurality of connector pin apertures that extend axially therethrough.
Figure 4:
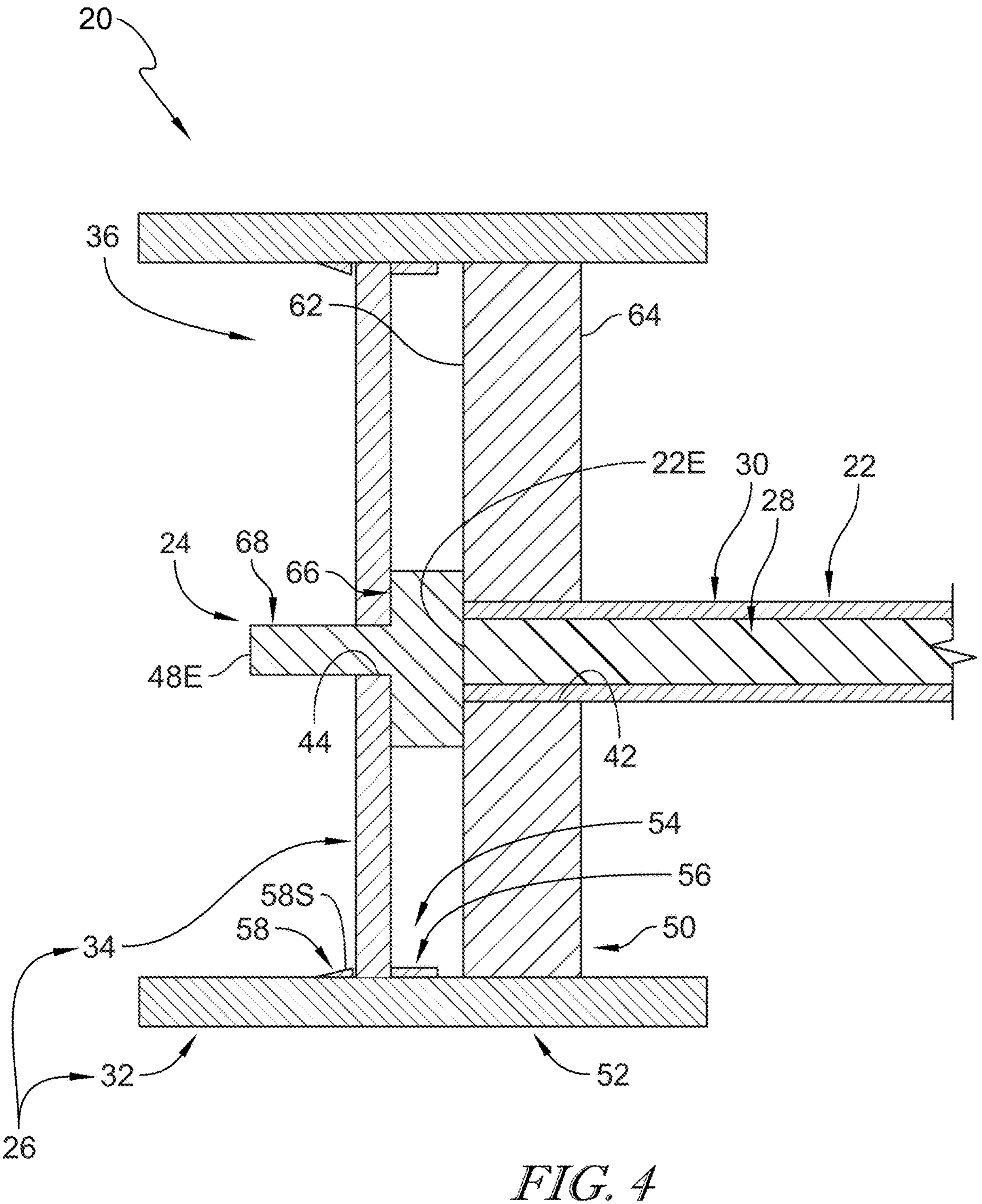
FIG. 4 is a cross-section and diagrammatic view of the wire harness of FIG. 2 showing a diameter of the wire aperture included in the plurality of wire apertures is sized to receive the wire core and the insulation layer of the respective wire that extends therethrough so that the associated connector pin of the plurality of connector pins is at least partially located in an interior cavity of the connector housing in a fixed position relative to the connector housing.

An illustrative wire harness 20 adapted for use with a piece of electrical equipment 10 is shown in FIGS. 1-4. The wire harness 20 includes a plurality of wires 22, a plurality of connector pins 24, and an electrical connector 26 as shown in FIGS. 2-4. The plurality of wires 22 each have a wire core 28 and an insulation layer 30 extending around the wire core 28. Each connector pin 24 of the plurality of connector pins is coupled to a terminal end 22E of an associated wire 22 included in the plurality of wires 22. The electrical connector 26 is configured to be coupled to the piece of electrical equipment 10 to route each of the wires 22 located inside the equipment 10 to outside of the equipment 10.

During early stages of product development for electrical equipment, such as an inverter, it may be difficult to model all the details of the piece of equipment to the level which will be implemented in the first prototype. For example, routing of wire or cable harnesses would have to account for every other wire and/or component in the equipment housing. The bend radius of each bundle of wires and complicating factors of cable construction such as splicing, variable rigidity in the heat sink tubing, and/or other bending methods may make it difficult to assemble the piece of equipment.

In some embodiments, uncertainty in the length and bending capability of the wires may be addressed by padding the length of the wires to ensure the first prototype's wires are not too short to connect. However, inside of the equipment housing, or other tightly packed electronics, even a wire harness that is too long may not be able to reach due to the bend radii of the wires. Therefore, the wire harness 20 of the present disclosure allows the length of each of the wires 22 to be adjusted while the wire harness 20 is installed in the equipment housing 12 of the piece of equipment 10.

The electrical connector 26 includes a connector housing 32 that extends circumferentially about an axis A to define an interior cavity 36 as shown in FIGS. 2-4. The connector housing 32 is formed to include a plurality of wire apertures 42 that extend axially through the connector housing 32. The diameter of each wire aperture 42 included in the plurality of wire apertures 42 is sized to receive the wire core 28 and the insulation layer 30 of the respective wire 22 that extends therethrough as shown in FIG. 4. Each wire aperture 42 has a diameter equal to or greater than the outer diameter of the insulation layer 30 so that each wire 22 may be inserted all the way through the connector housing 32.

The diameter of the wire apertures 42 allows each wire 22, with the insulation layer 30, to be passed through the connector housing 32 and moved to a desired length before each wire 22 is cut to the desire length and the associated connector pin 24 coupled thereto. For conventional wire harnesses, the connector pins are crimped or soldered to each wire after it has been cut to its final length and then each connector pin is inserted into the connector from the back where each pin snaps into holes. These holes admit each pin itself, but are too small for the entire wire to go through.

The wire apertures 42 in the connector housing 32 however are sized so that the diameter of the wire aperture 42 is equal to or greater than the outer diameter of the insulation layer 30 of each wire 22 as shown in FIG. 4. In this way, the wire 22 may pass through the connector housing 32. In this way, the wire 22 may be passed through the equipment housing 12 to the outside surrounding the equipment housing 12 as suggested in FIGS. 5 and 6. This further allows the wires 22 to be organized and quickly identified during assembly, testing, etc. because the wires 22 extend through their associated wire apertures 42 that are often charted in an engineering schematic or drawing. The wire 22 may be moved to its desired length before it is cut to the desired length as shown in FIGS. 6 and 7.

Figure 7:
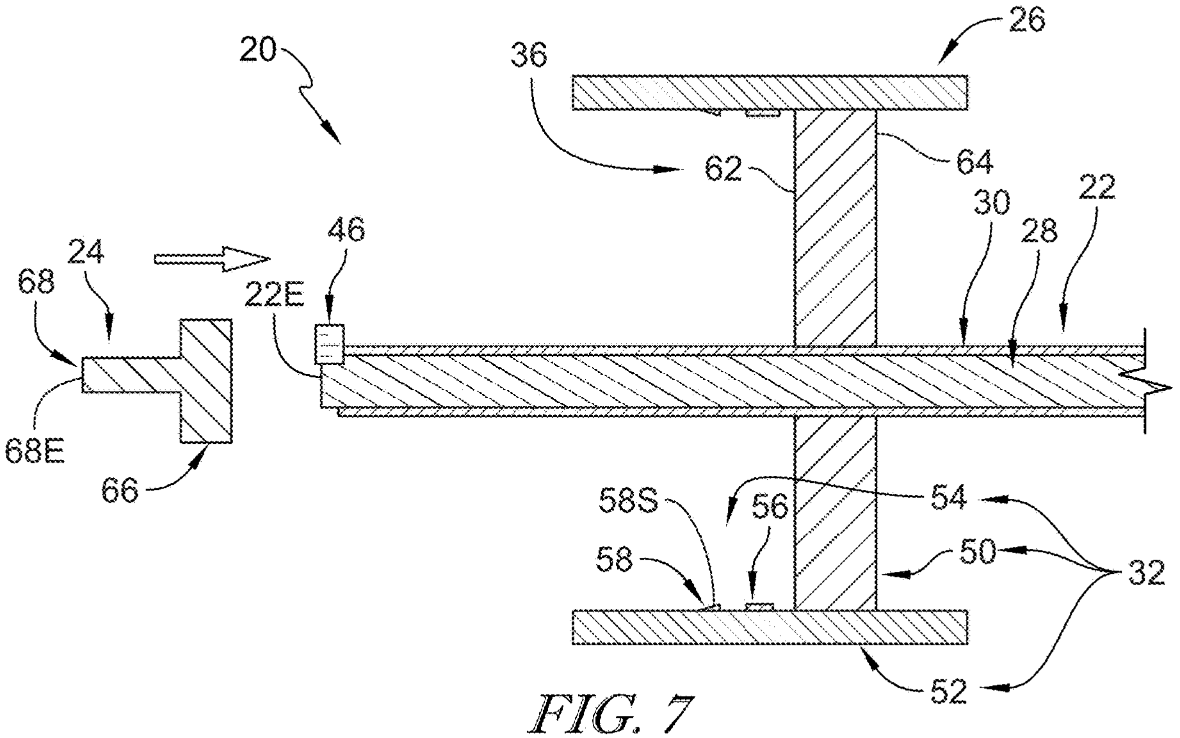
FIG. 7 is a cross-section and diagrammatic view similar to FIG. 6 showing the wire has been cut to the desired length so that the connector pin may be coupled to the terminal end of the wire while the wire extends through the connector housing.
Figure 8:
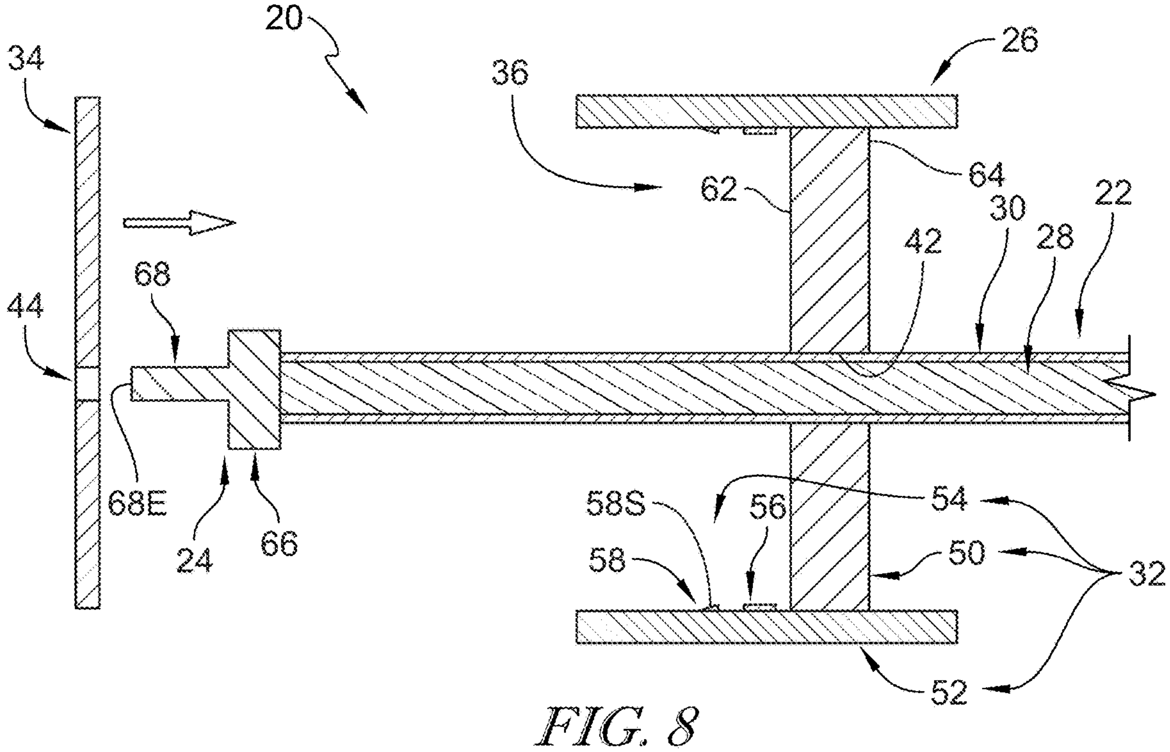
FIG. 8 is a cross-section and diagrammatic view similar to FIG. 7 showing the connector pin has been coupled to the terminal end of the wire and the connector cap is arranged so that the connector pin may be inserted into the connector pin aperture formed in the connector cap.

Then, while the wire 22 still extends through the connector housing 32, the associated connector pin 24 is coupled to the terminal end 22E of the wire 22 as suggested in FIGS. 7 and 8. The connector pin 24 may be coupled to the terminal end 22E of the wire by crimping or soldering the connector pin 24 to the wire 22.

Figure 9:
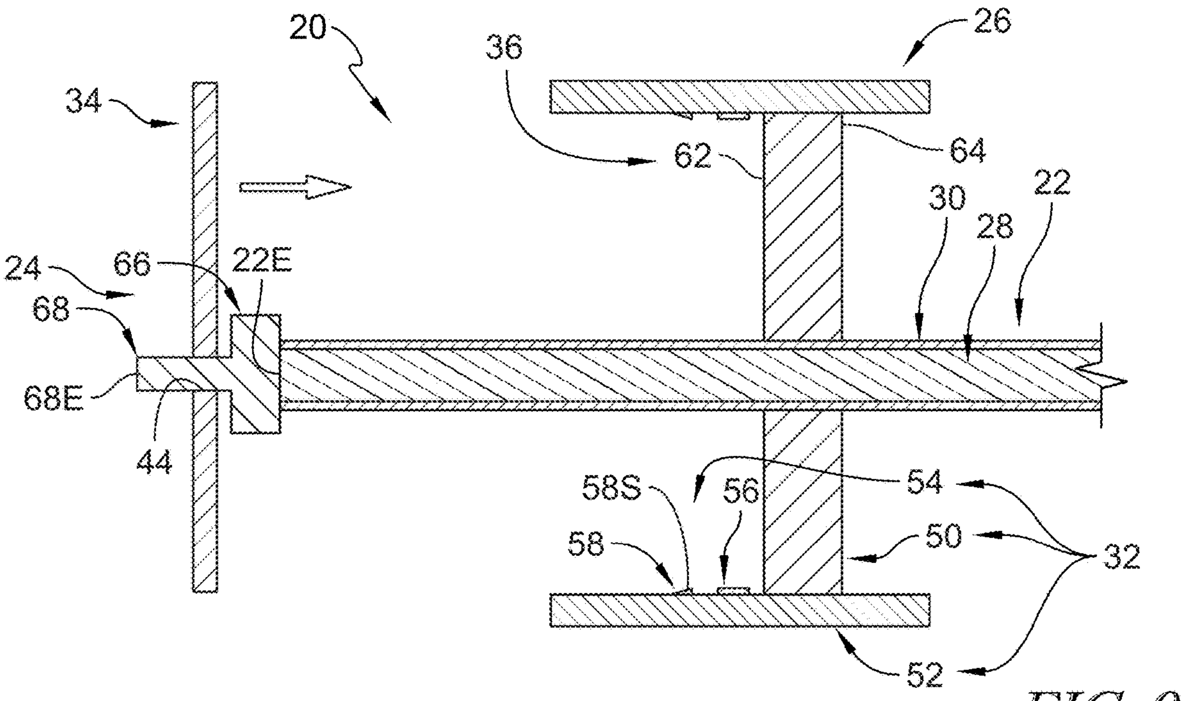
FIG. 9 is a cross-section and diagrammatic view similar to FIG. 8 showing the connector pin has been inserted into the connector pin aperture formed in the connector cap before the connector cap is coupled to the connector housing.
Figure 10:
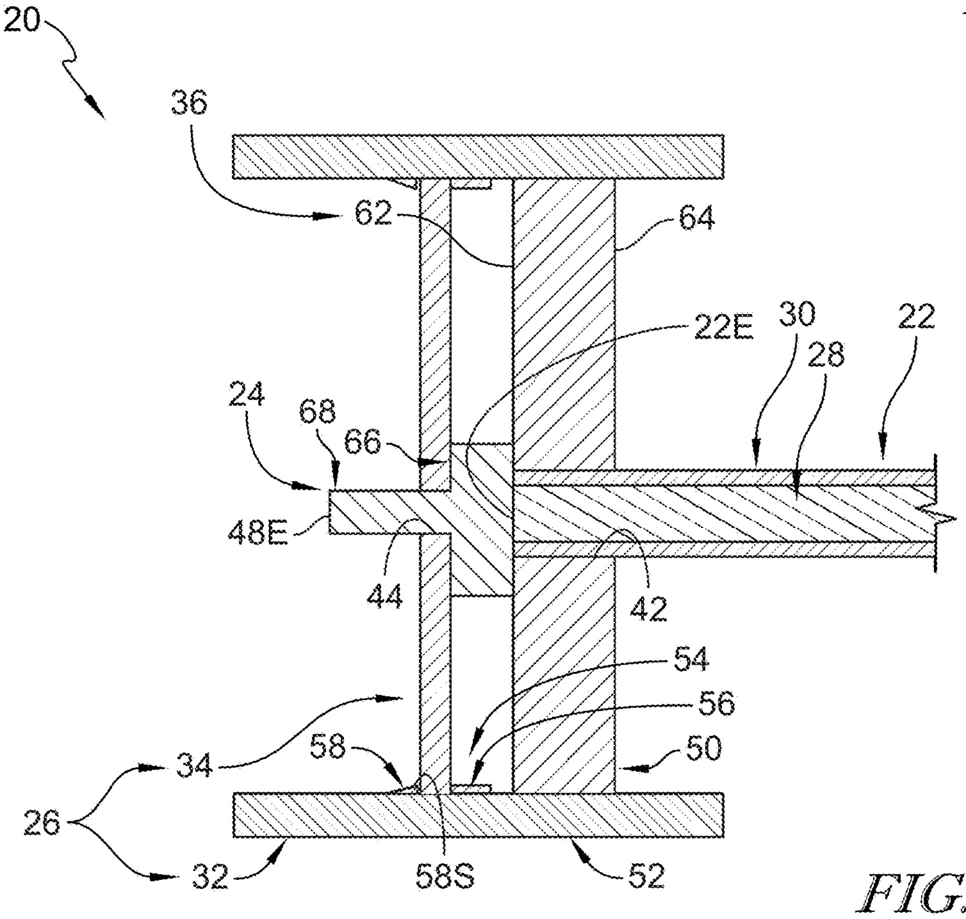
FIG. 10 is a cross-section and diagrammatic view similar to FIG. 9 showing the connector cap has been moved toward the connector housing with the connector pin inserted into the connector pin aperture so as to trap a portion of the connector pin in a fixed position axially between the connector housing and the connector cap.

Once the connector pin 24 is coupled to the wire 22, the connector pin 24 is fixed relative to the connector housing 32 as suggested in FIGS. 9 and 10. In the illustrative embodiment, the electrical connector 26 includes a connector cap 34 configured to be selectively coupled to the connector housing 32 to fix the connector pins 24 relative to the connector housing 32 as shown in FIGS. 3, 9, and 10. In other embodiments, the connector pins 24 may be fixed relative to the connector housing 32 using another suitable method like those shown in FIGS. 11 and 12.

In the illustrative embodiment, the electrical connector 26 includes the connector housing 32 and the connector cap 34 as shown in FIGS. 3 and 4. The connector housing 32 is formed to define the plurality of wire apertures 42 and the connector cap 34 is formed to define a plurality of connector pin apertures 44 as shown in FIGS. 3 and 4.

Each connector pin aperture 44 formed in the connector cap 34 has a diameter that is less than the diameter of the wire aperture 42 formed in the connector housing 32 as shown in FIG. 4. The connector pin aperture 44 has a smaller diameter to receive the associated connector pin 24 while trapping the connector pin 24 axially between the connector cap 34 and the connector housing 32 in a fixed position relative to the connector housing 32. The connector pin 24 is at least partially located in the interior cavity 36 of the connector housing 32.

The connector housing 32 includes a back plate 50, an outer wall 52, and a cap retainer 54 as shown in FIG. 4. The back plate 50 is formed to include the plurality of wire apertures 42. The outer wall 52 extends axially away from the back plate 50. The outer wall 52 extends circumferentially about the axis A to define the interior cavity 36. The cap retainer 54 is coupled to the outer wall 52. The cap retainer 54 is configured to engage the connector cap 34 to selectively couple the connector cap 34 to the connector housing 32.

The cap retainer 54 includes a retainer tab 56 and a lock tab 58 as shown in FIGS. 4 and 9. The retainer tab 56 extends radially inward from the outer wall 52 into the interior cavity 36. The lock tab 58 extends radially inward from the outer wall 52 into the interior cavity 36. Both the retainer tab 56 and the lock tab 58 extend circumferentially at least partway about the axis A.

The lock tab 58 is spaced apart axially from the retainer tab 56 to define a notch 60 therebetween as shown in FIGS. 4 and 9. The lock tab 58 is formed to include a ramp surface 58S shaped so that when the connector cap 34 is moved toward the connector housing 32 from an unlocked position as shown in FIG. 9 to a locked position as shown in FIG. 10 the connector cap 34 bends around the lock tab 58 as the connector cap 34 contacts the ramp surface 58S to allow the connector cap 34 to pass the lock tab 58 and to move into the notch 60 between the lock tab 58 and the retainer tab 56 to retain the connector cap 34 in the notch 60.

The back plate 50 has a first axially-facing surface 62 and a second axially-facing surface 64 that faces opposite the first axially-facing surface 62 as shown in FIG. 4. The first axially-facing surface 62 defines a portion of the interior cavity 36. The second axially-facing surface 64 faces towards the interior of the enclosure housing 12 of the piece of equipment 10. The wire apertures 42 extend axially between the first and second axially-facing surfaces 62, 64.

In the illustrative embodiment, each connector pin 24 has a pin body 66 and a pin rod 68 as shown in FIG. 4. The pin body 66 is trapped axially between the back plate 50 of the connector housing 32 and the connector cap 34. The pin rod 68 extends axially from the pin body 66 into one of the corresponding connector pin aperture 44 so that a terminal end 68E of the pin rod 68 extends axially past the connector cap 34. The diameter of the connector pin aperture 44 is equal to or greater than an outer diameter of the pin rod 68 in the illustrative embodiment as shown in FIG. 4.

Figure 5:
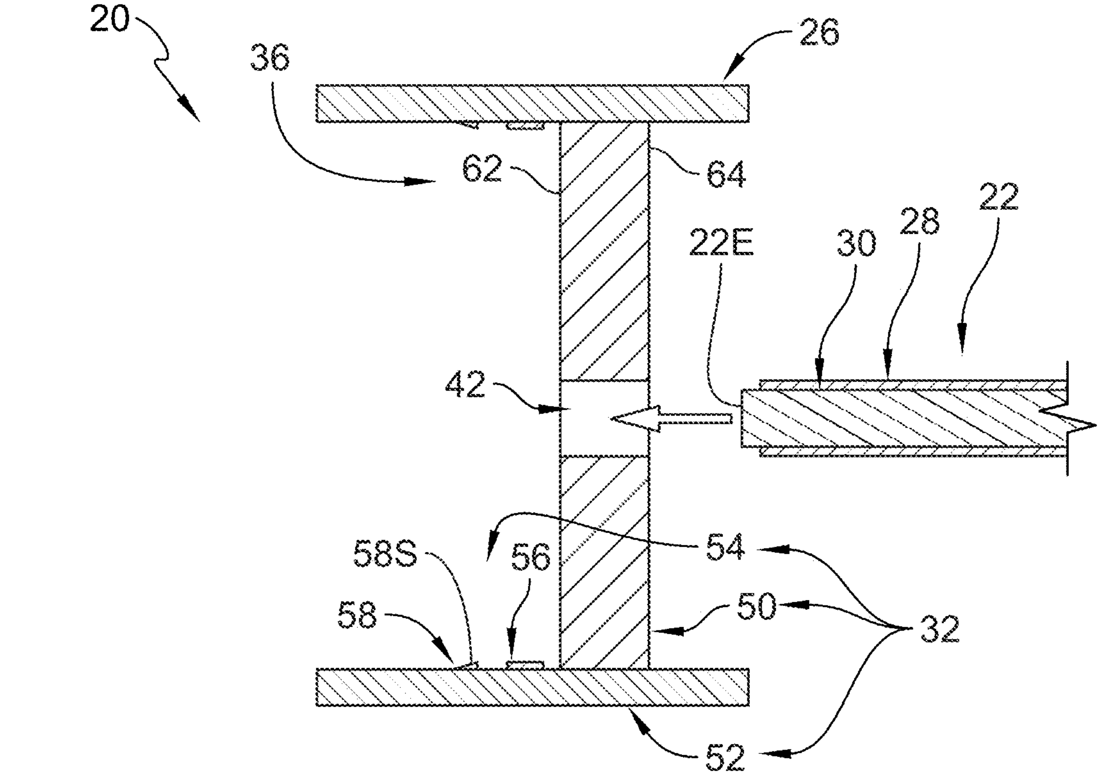
FIG. 5 is a cross-section and diagrammatic view of the wire harness of FIG. 2 before the wire is inserted through the associated wire aperture showing the connector housing includes a back plate formed to include the plurality of wire apertures, an outer wall that extends axially and circumferentially about the axis to define the interior cavity of the connector housing, and a cap retainer coupled to the outer wall so as to engage the connector cap to selectively couple the connector cap to the connector housing.
Figure 6:
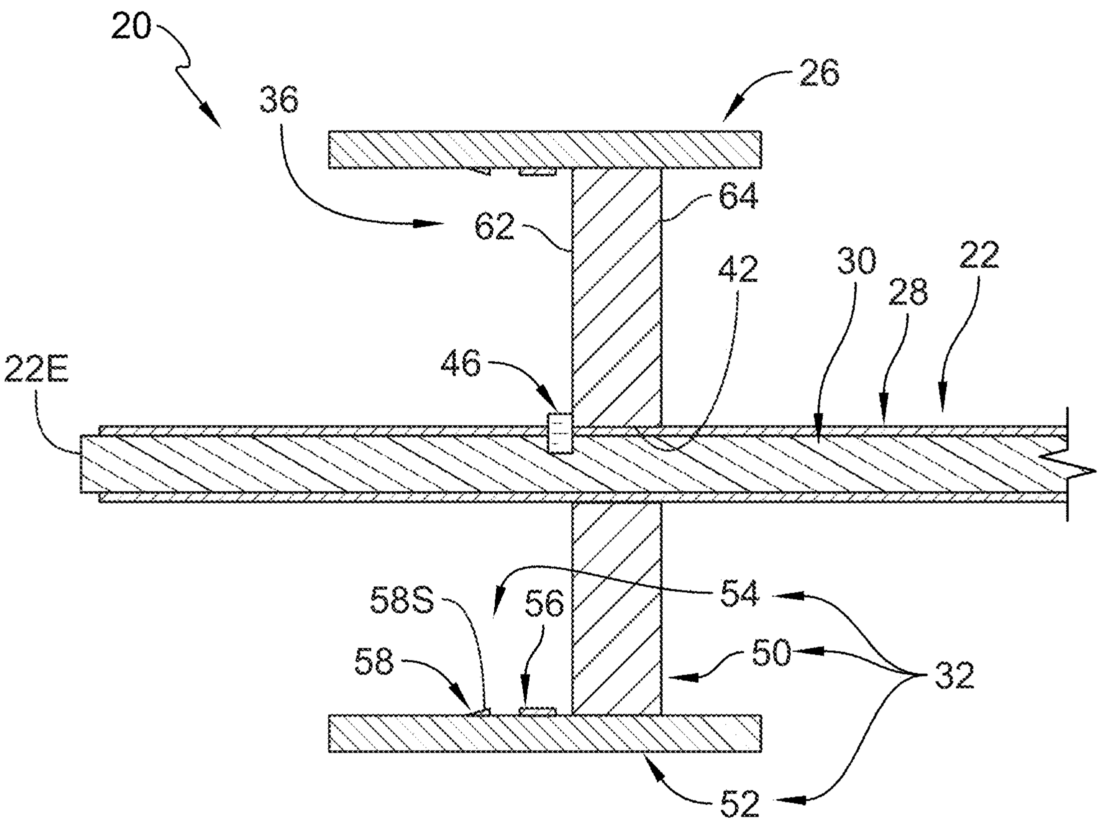
FIG. 6 is a cross-section and diagrammatic view similar to FIG. 5 showing the wire has been inserted through the wire aperture into the interior cavity of the connector housing and pulled through so that the wire has a desired length before the wire is marked at a location where the wire is to be cut to the desired length.

A method to size each wire 22 to the desired length and assemble the wire harness 20 with the piece of electrical equipment 10 may include several steps as shown in FIGS. 5-10. First, the connector housing 32 may be assembled on the equipment housing 12 so that the wires 22 may be passed through the connector housing 32 from inside the equipment housing 12 to outside the equipment housing 12. Each wire 22 may be inserted through an associated wire aperture 42 formed in the connector housing 32 of the electrical connector 26 as shown in FIG. 5. Each wire 22 may be inserted through an associated wire aperture 42 so that the wire 22 extends into the interior cavity 36 outside of the equipment housing 12 as shown in FIG. 6.

Once the wire 22 is inserted through the connector housing 32, the method includes moving the wire 22 through the connector housing 32 so that the wire 22 has a desired length as shown in FIG. 6. Each wire 22 may be pulled through the connector housing 32 to the desired length and marked before each wire is cut to provide the desired length of wire 22. The marked location 46 of where the wire 22 should be cut to the desired length is shown in FIGS. 6 and 7. These steps may be repeated for each wire 22 in the wire harness 20.

After each of the wires 22 is cut, each connector pin 24 is coupled to a terminal end 22E of the associated wire 22 while the wire 22 extends through the connector housing 32 as shown in FIG. 7. Then, the connector pin 24 is coupled to the connector housing 32 to fix the connector pin 24 relative to the connector housing 32 as shown in FIGS. 8-10.

In the illustrative embodiment, the connector pin 24 is coupled to the connector housing 32 using the connector cap 34. First, an end 68E of each connector pin 24 is inserted into an associated connector pin aperture 44 formed in the connector cap 34 as shown in FIGS. 8 and 9. Next, the connector cap 34 is coupled to the connector housing 32 as shown in FIGS. 9 and 10.

The connector cap 34 is coupled to the connector housing 32 so that the connector pin 24 is located in a fixed position axially between the connector housing 32 and the connector cap 34 as shown in FIG. 10. The connector cap 34 is moved from the unlocked position as shown in FIG. 9 to the locked position as shown in FIG. 10. In the unlocked position, the connector cap 34 is spaced apart from the connector housing 32 outside of the interior cavity 36 of the connector housing 32 and free to move relative to the connector housing 32. In the locked position, the connector cap 34 is located in the interior cavity 36 of the connector housing 32 and engaged with the cap retainer 54. The cap retainer 54 blocks axial movement of the connector cap 34 relative to the connector housing 32 to hold the connector pins 24 in the fixed position.

Figure 11:
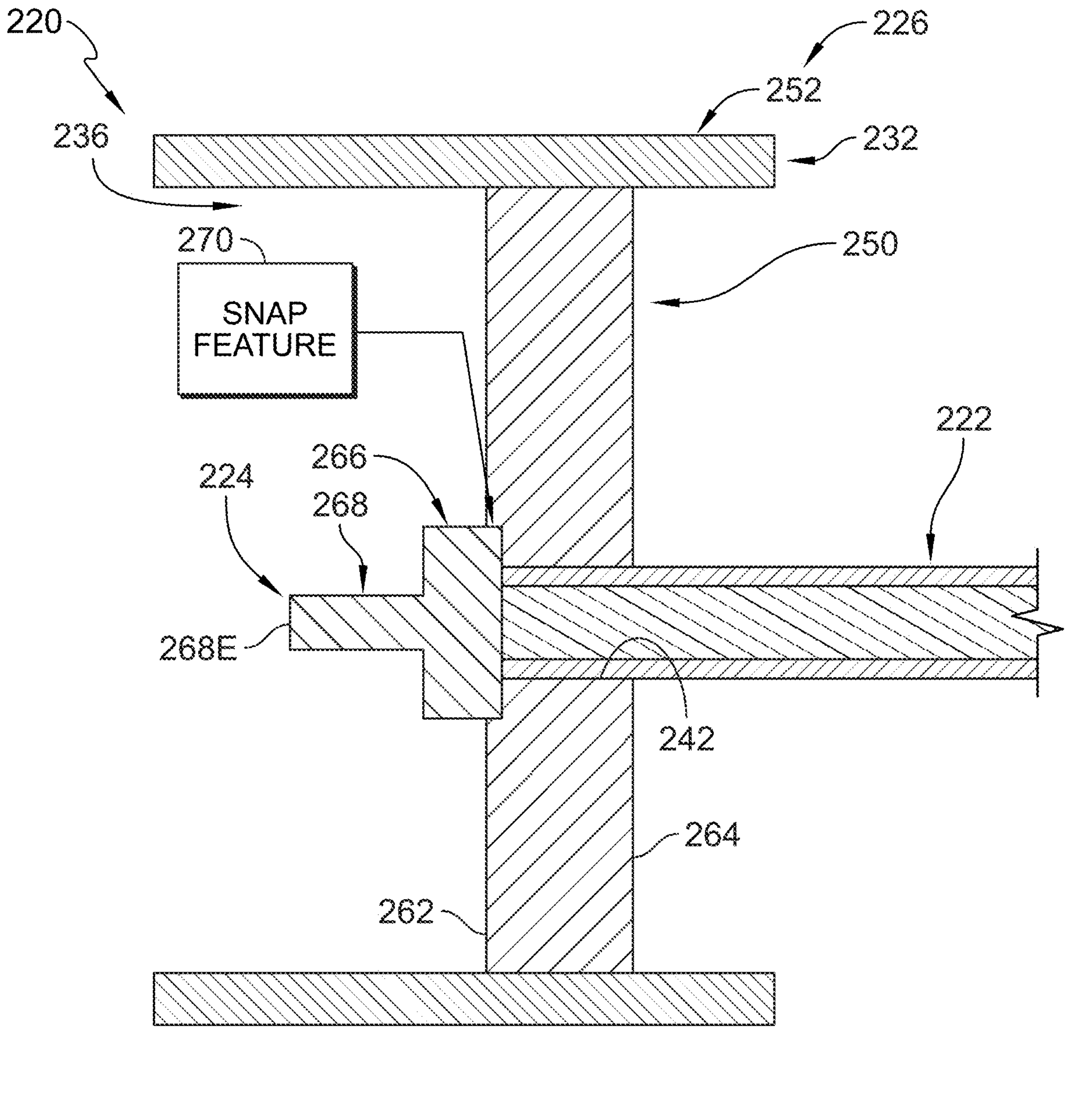
FIG. 11 is a cross-section and diagrammatic view of the another embodiment of a wire harness adapted for use with the piece of electrical equipment of FIG. 1 showing the wire harness includes a wire, a connector pin each coupled to the wire, and an electrical connector having a connector housing that receives the wire and a snap feature formed in an axially-facing surface of the connector housing that mates with the connector pin so that the connector pin snap-fits into the connector housing to retain the connector pin and the wire to the connector housing.

Another embodiment of wire harness 220 in accordance with the present disclosure is shown in FIG. 11. The wire harness 220 is substantially similar to the wire harness 20 shown in FIGS. 1-10 and described herein. Accordingly, similar reference numbers in the 200 series indicate features that are common between the wire harness 20 and wire harness 220. The description of the wire harness 20 is incorporated by reference to apply to the wire harness 220, except in instances when it conflicts with the specific description and the drawings of the wire harness 220.

The wire harness 220 includes a plurality of wires 222, a plurality of connector pins 224, and an electrical connector 226 as shown in FIG. 11. The electrical connector 226 includes a connector housing 232 that extends circumferentially about the axis A to define an interior cavity 236 as shown in FIG. 11. The connector housing 232 is formed to include a plurality of wire apertures 242 that extend axially through the connector housing 232.

The wire apertures 242 in the connector housing 232 are sized so that the diameter of the wire aperture 242 is equal to or greater than the outer diameter of the insulation layer of each wire 222 so that the wire 222 may pass through the connector housing 232 as shown in FIG. 11. In this way, the wire 222 may be passed through the equipment housing 12 to the outside surrounding the equipment housing 12. The wire 222 may be moved to its desired length before it is cut to the desired length. Then, while the wire 222 still extends through the connector housing 232, the associated connector pin 224 is coupled to the terminal end of the wire 222.

Once the connector pin 224 is coupled to the wire 222, the connector pin 224 is fixed relative to the connector housing 232. In the illustrative embodiment, the connector housing 232 of the electrical connector 226 includes a snap feature 270 for each connector pin 224 to retain the connector pins 224 to the connector housing 232. Unlike the embodiment in FIGS. 1-10, the electrical connector 226 of FIG. 11 does not include connector cap and instead the connector pins 224 are snap-fit with the snap feature 270 formed in a first axially-facing surface 262 of the connector housing 232 in the interior cavity 236.

The connector housing 232 includes a back plate 250 and an outer wall 252. The back plate 250 is formed to include the plurality of wire apertures 242. The outer wall 252 extends axially away from the back plate 250. The outer wall 252 extends circumferentially about the axis A to define the interior cavity 236.

The snap features 270 are formed in the back plate 250 of the connector housing 232 in the illustrative embodiment. Each snap feature 270 aligns with one of the wire apertures 242 in the connector housing 232.

The back plate 250 has the first axially-facing surface 262 and a second axially-facing surface 264 that faces opposite the first axially-facing surface 262 as shown in FIG. 11. The first axially-facing surface 262 defines a portion of the interior cavity 236. The second axially-facing surface 264 faces towards the interior of the enclosure housing 12 of the piece of equipment 10. The wire apertures 242 extend axially between the first and second axially-facing surfaces 262, 264.

In the illustrative embodiment, each connector pin 224 has a pin body 266 and a pin rod 268 as shown in FIG. 11. The pin body 266 is mates with the associated snap feature 270 in the back plate 250 to hold the connector pin 224 in the fixed position relative to the connector housing 232. The pin rod 268 extends axially from the pin body 266 so that a terminal end 268E of the pin rod 268 extends axially away from the back plate 250.

A method to size each wire 222 to the desired length and assemble the wire harness 220 with the piece of electrical equipment 10 may include similar steps like as shown in FIGS. 5-10. However, the connector pin 224 is coupled to the connector housing 232 using the snap feature 270 instead of the connector cap 34. To couple the connector pin 224 to the connector housing 232, the pin body 266 of the connector pin 224 is inserted into the snap feature 270 on the back plate 250 of the connector housing 232.

Figure 12:
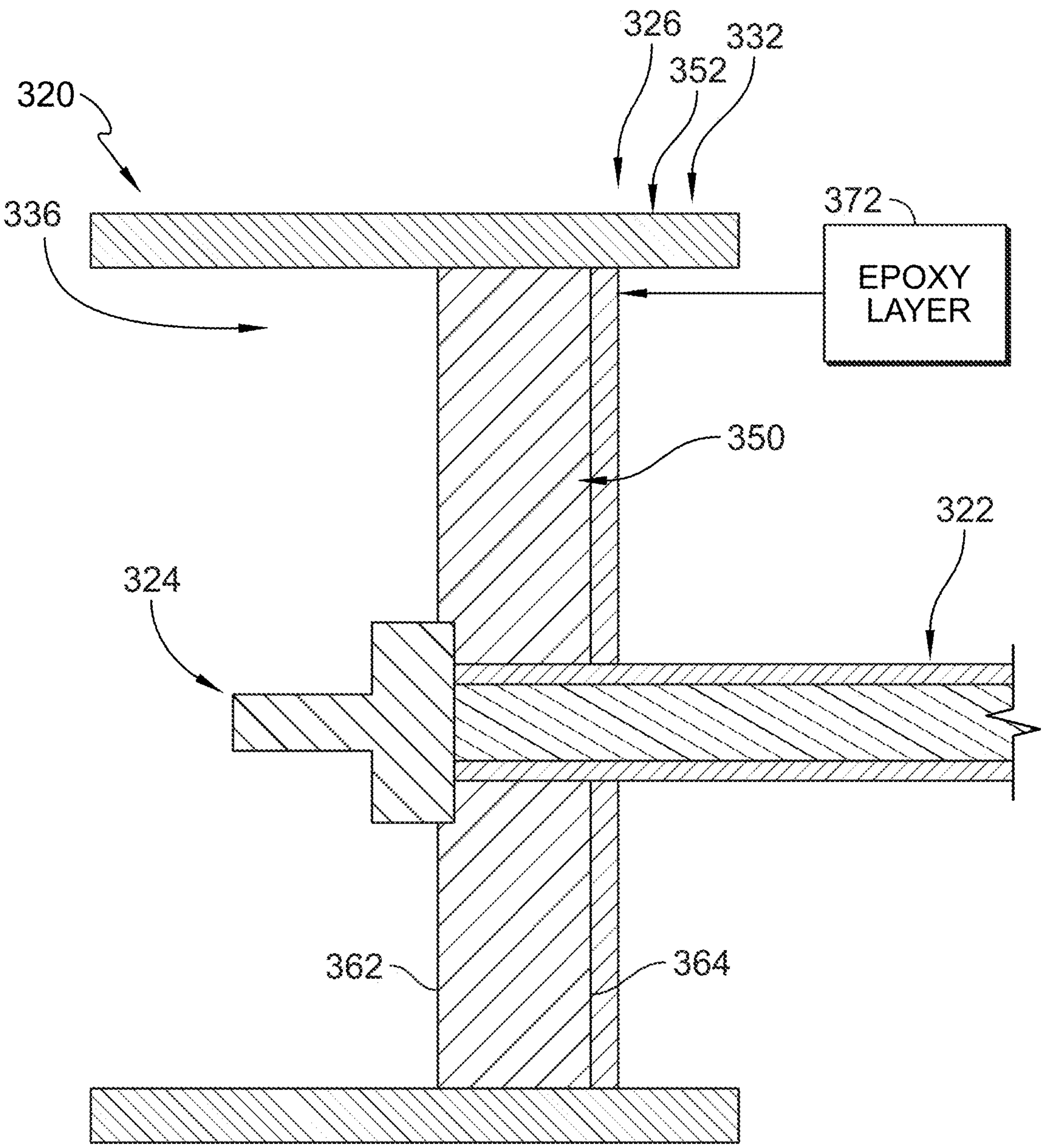
FIG. 12 is a cross-section and diagrammatic view of the another embodiment of a wire harness adapted for use with the piece of electrical equipment of FIG. 1 showing the wire harness includes a wire, a connector pin each coupled to the wire, and an electrical connector having a connector housing that receives the wire and an epoxy layer applied to an axially-facing surface of the connector housing to retain the connector pin and the wire to the connector housing.

Another embodiment of wire harness 320 in accordance with the present disclosure is shown in FIG. 12. The wire harness 320 is substantially similar to the wire harness 20 shown in FIGS. 1-10 and described herein. Accordingly, similar reference numbers in the 300 series indicate features that are common between the wire harness 20 and wire harness 320. The description of the wire harness 20 is incorporated by reference to apply to the wire harness 320, except in instances when it conflicts with the specific description and the drawings of the wire harness 320.

The wire harness 320 includes a plurality of wires 322, a plurality of connector pins 324, and an electrical connector 326 as shown in FIG. 12. The electrical connector 326 includes a connector housing 332 that extends circumferentially about the axis A to define an interior cavity 336 as shown in FIG. 12. The connector housing 332 is formed to include a plurality of wire apertures 342 that extend axially through the connector housing 332.

The wire apertures 342 in the connector housing 332 are sized so that the diameter of the wire aperture 342 is equal to or greater than the outer diameter of the insulation layer of each wire 322 so that the wire 322 may pass through the connector housing 332 as shown in FIG. 12. In this way, the wire 322 may be passed through the equipment housing 12 to the outside surrounding the equipment housing 12. The wire 322 may be moved to its desired length before it is cut to the desired length. Then, while the wire 322 still extends through the connector housing 332, the associated connector pin 324 is coupled to the terminal end of the wire 322.

Once the connector pin 324 is coupled to the wire 322, the connector pin 324 is fixed relative to the connector housing 332. In the illustrative embodiment, the connector housing 332 of the electrical connector 326 includes an epoxy layer 372 applied to a second axially-facing surface 364 of the connector housing 332 to retain the connector pins 324 and the wires 322 to the connector housing 332. Unlike the embodiment in FIGS. 1-10, the electrical connector instead using epoxy material applied to the back side of the connector housing 332 inside the equipment housing 12 to hold everything in place.

The connector housing 332 includes a back plate 350 and an outer wall 352. The back plate 350 is formed to include the plurality of wire apertures 342. The outer wall 352 extends axially away from the back plate 350. The outer wall 352 extends circumferentially about the axis A to define the interior cavity 336.

The back plate 350 has a first axially-facing surface 362 and the second axially-facing surface 364 that faces opposite the first axially-facing surface 362 as shown in FIG. 12. The first axially-facing surface 362 defines a portion of the interior cavity 336. The second axially-facing surface 364 faces towards the interior of the enclosure housing 12 of the piece of equipment 10. The wire apertures 342 extend axially between the first and second axially-facing surfaces 362, 364 and the epoxy layer 372 is applied to the second axially-facing surface 364 of the back plate 350 as shown in FIG. 12.

A method to size each wire 322 to the desired length and assemble the wire harness 320 with the piece of electrical equipment 10 may include similar steps like as shown in FIGS. 5-10. However, the connector pin 324 is coupled to the connector housing 332 using the epoxy material instead of the connector cap 34. In some embodiments, the epoxy layer 372 may be used in addition to the connector cap 34 to help hold everything in place on the connector housing 332. To couple the connector pin 324 to the connector housing 332 in the fixed position, the connector pin 324 is pulled flush to the first axially-facing surface 362 and the epoxy layer 372 is applied to the second axially-facing surface 364 of the back plate 350 to retain the connector pin 324 and the wire 322 in place.

The present disclosure relates to a variable wire harness 20, 220, 320 were the length of each of the wires 22, 222, 322 may be adjusted to the desired length once installed. The wire harness 20, 220, 320 may be at the enclosure exit of a prototype electrical equipment or device 10, 210, 310.

The electrical connector 26, 226, 326 of the wire harness 20, 220, 320 has wire apertures 42, 242 that are large enough for each wire 22, 222, 322 and its insulation layer 30 to pass through to the outside of the box 12. The wires may be passed through the electrical connector 26, 226, 326 with 10 cm or more sticking through, and before the connector pins 24, 224, 324 are coupled to the terminal end 22E of the associated wire 22, 222, 322.

When the box 12 is assembled, the internal connectors/ wires 22, 222, 322 are pulled to desired length, this is marked on the outside of the insulation 12 where it meets the connector housing 32, 232, 33. Then, the wire harness 20, 220, 320 is removed and the wires 22, 222, 322 are pulled through the connector housing 32, 232, 332, cut and terminated at the mark, and then pulled back into place where new pins 24, 224, 324, which are larger than the wire aperture 42, 242, constrain the wire 22, 222, 322 at its final length. In this way, the wire harness 20, 220, 320 may be accurately fitted to the proper size in an expedient manner.

As a last step, the connector pins 24, 224, 324 may be immobilized relative to the electrical connector 26, 226, 326 and prevented from sliding out of the box 12 when a mating connector is removed. For example, the connector pins 24, 224, 324 may be designed to snap in place when pulled tight as shown in FIG. 11. In another embodiment, an epoxy filling 372 may be used to immobilize the wire harness 220, from the inside of the enclosure 2 to avoid fouling the pins 224. In another embodiment, a connector cap 34 may be put over the crimped pins 24 from the outside, leaving only the connector pins 24 themselves sticking through as shown in FIG. 4.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of assembling a wire harness adapted for use with a piece of electrical equipment, the method comprising providing at least one wire, at least one connector pin, and an electrical connector that includes a connector housing that extends circumferentially about an axis to define an interior cavity, inserting the at least one wire through a wire aperture formed in the connector housing of the electrical connector so that the at least one wire extends into the interior cavity, moving the at least one wire through the connector housing so that the at least one wire has a desired length, cutting the at least one wire to provide the desired length of wire, coupling the at least one connector pin to a terminal end of the at least one wire while the at least one wire extends through the connector housing, and coupling the at least one connector pin with the connector housing, wherein the electrical connector further includes a connector cap configured to be selectively coupled to the connector housing to close off a portion of the interior cavity, and wherein coupling the at least one connector pin with the connector housing includes inserting an end of the at least one connector pin into a connector pin aperture formed in the connector cap and coupling the connector cap to the connector housing so that a portion of the at least one connector pin is located in a fixed position axially between the connector housing and the connector cap.

2. The method of claim 1, wherein the at least one wire has a wire core and an insulation layer extending around the wire core and a diameter of the wire aperture is equal to or greater than an outer diameter of the insulation layer of the at least one wire.

3. The method of claim 1, wherein the connector pin aperture formed in the connector cap has a diameter that is less than a diameter of the wire aperture formed in the connector housing.

4. The method of claim 3, wherein the at least one connector pin includes a pin body and a pin rod that extends axially from the pin body into the connector pin aperture so that a terminal end of the pin rod extends axially past the connector cap.

5. The method of claim 1, wherein the connector housing includes a back plate formed to include the wire aperture, an outer wall that extends axially away from the back plate and extends circumferentially about the axis to define the interior cavity, and a cap retainer coupled to the outer wall and configured to engage the connector cap to selectively couple the connector cap to the connector housing.

6. The method of claim 5, wherein the cap retainer includes a retainer tab that extends radially inward from the outer wall into the interior cavity and extends circumferentially at least partway about the axis and a lock tab that extends radially inward from the outer wall into the interior cavity and extends circumferentially at least partway about the axis, the lock tab spaced apart axially from the retainer tab to define a notch therebetween, and the lock tab is formed to include a ramp surface shaped so that when the connector cap is moved toward the connector housing into contact with the ramp surface the connector cap bends around the lock tab to allow the connector cap to pass the lock tab and to move into the notch between the lock tab and the retainer tab to retain the connector cap in the notch.

7. The method of claim 1, wherein the at least one connector pin has a diameter that is greater than a diameter of the wire aperture formed in the connector housing.

8. The method of claim 1, wherein the connector housing includes a back plate formed to include the wire aperture and an outer wall that extends axially away from the back plate and extends circumferentially about the axis to define the interior cavity, the back plate having a first axially-facing surface that defines a portion of the interior cavity and a second axially-facing surface that faces opposite the first axially-facing surface.

9. A method of assembling a wire harness adapted for use with a piece of electrical equipment, the method comprising providing at least one wire, at least one connector pin, and an electrical connector that includes a connector housing that extends circumferentially about an axis to define an interior cavity, inserting the at least one wire through a wire aperture formed in the connector housing of the electrical connector so that the at least one wire extends into the interior cavity, moving the at least one wire through the connector housing so that the at least one wire has a desired length, cutting the at least one wire to provide the desired length of wire, coupling the at least one connector pin to a terminal end of the at least one wire while the at least one wire extends through the connector housing, and coupling the at least one connector pin with the connector housing, wherein the connector housing includes a back plate formed to include the wire aperture and an outer wall that extends axially away from the back plate and extends circumferentially about the axis to define the interior cavity, the back plate having a first axially-facing surface that defines a portion of the interior cavity and a second axially-facing surface that faces opposite the first axially-facing surface, and wherein coupling the at least one connector pin with the connector housing includes inserting the at least one connector pin into a corresponding snap feature in the first axially-facing surface of the back plate configured to retain the at least one connector pin in a fixed position relative to the connector housing.

10. The method of claim 9, wherein the at least one wire has a wire core and an insulation layer extending around the wire core and a diameter of the wire aperture is equal to or greater than an outer diameter of the insulation layer of the at least one wire.

11. The method of claim 9, wherein the at least one connector pin includes a pin body and a pin rod that extends axially from the pin body.

12. The method of claim 9, wherein the at least one connector pin has a diameter that is greater than a diameter of the wire aperture formed in the connector housing.

* * * * *